(12) United States Patent
Verkoeijen et al.

(10) Patent No.: US 12,203,048 B2
(45) Date of Patent: Jan. 21, 2025

(54) VEGETABLE OIL COMPRISING A POLYUNSATURATED FATTY ACID HAVING AT LEAST 20 CARBON ATOMS

(71) Applicant: DSM IP ASSETS B.V., Heerlen (NL)

(72) Inventors: Daniel Verkoeijen, Echt (NL); Kristian Zuur, Echt (NL); Hendrik Louis Bijl, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 486 days.

(21) Appl. No.: 17/171,748

(22) Filed: Feb. 9, 2021

(65) Prior Publication Data

US 2021/0163843 A1 Jun. 3, 2021

Related U.S. Application Data

(60) Division of application No. 14/557,303, filed on Dec. 1, 2014, now abandoned, which is a continuation of application No. 13/504,148, filed as application No. PCT/EP2010/066599 on Nov. 2, 2010, now abandoned.

(60) Provisional application No. 61/257,772, filed on Nov. 3, 2009.

(51) Int. Cl.
| | |
|---|---|
| C11B 1/10 | (2006.01) |
| A01C 1/00 | (2006.01) |
| A23D 7/00 | (2006.01) |
| A23D 9/00 | (2006.01) |
| A23L 33/00 | (2016.01) |

(52) U.S. Cl.
CPC .................. *C11B 1/10* (2013.01); *A01C 1/00* (2013.01); *A23D 7/003* (2013.01); *A23D 9/00* (2013.01); *A23L 33/40* (2016.08); *A23V 2002/00* (2013.01)

(58) Field of Classification Search
CPC ........... A23L 33/40; A23D 7/003; A23D 9/00; A01C 1/00
See application file for complete search history.

(56) References Cited

U.S. PATENT DOCUMENTS

| | | | |
|---|---|---|---|
| 4,063,018 | A | 12/1977 | Ohnaka et al. |
| 4,948,811 | A | 8/1990 | Spinner et al. |
| 7,419,596 | B2 | 9/2008 | Dueppen et al. |
| 7,741,500 | B2 | 6/2010 | Arhancet et al. |
| 8,084,074 | B2 | 12/2011 | Kinney et al. |
| 2004/0047971 | A1 | 3/2004 | Alander |
| 2005/0008756 | A1 | 1/2005 | Fan |
| 2006/0110521 | A1 | 5/2006 | Heise et al. |
| 2007/0065565 | A1 | 3/2007 | Kincs et al. |
| 2007/0141222 | A1 | 6/2007 | Binder et al. |
| 2008/0194685 | A1 | 8/2008 | Damude et al. |
| 2008/0220143 | A1 | 9/2008 | Kinney et al. |
| 2009/0169650 | A1 | 7/2009 | Wilkes |
| 2009/0222951 | A1 | 9/2009 | Cirpus et al. |
| 2010/0212034 | A1* | 8/2010 | Cirpus ............... C12N 15/8247 435/243 |
| 2010/0227924 | A1 | 9/2010 | Cirpus et al. |
| 2015/0050409 | A1 | 2/2015 | Arhancet |

FOREIGN PATENT DOCUMENTS

| | | |
|---|---|---|
| CN | 101484562 A | 7/2009 |
| CN | 101098628 B | 9/2010 |
| EP | 0323753 A1 | 7/1989 |
| HU | 9600336 A2 | 11/1998 |
| HU | 9600336 A3 | 11/1998 |
| WO | 1995011289 A1 | 4/1995 |
| WO | 1996027285 A1 | 9/1996 |
| WO | 2004071467 A2 | 8/2004 |
| WO | 2005059130 A1 | 6/2005 |
| WO | 2005083093 A2 | 9/2005 |
| WO | 2006052662 A2 | 5/2006 |
| WO | 2008009600 A1 | 1/2008 |
| WO | 2008100545 A2 | 8/2008 |
| WO | 2008124048 A2 | 10/2008 |
| WO | 2008124806 A2 | 10/2008 |
| WO | 2008128240 A1 | 10/2008 |

OTHER PUBLICATIONS

Justice et al., "Principles and Practices of Seed Storage". Agricultural Handbook No. 506. (Year: 1978).*
Dunford, "Oil and Oilseed Processing I". Available online at http://dasnr40.dasnr.okstate.edu/documents/fapc-158-oil-and-oilseed-processing-i/ (Year: 2008).*
Choo et al, Journal of Food Composition and Analysis, "Phyisicochemical and quality characteristics of cold-pressed flaxseed oils," 2006, pp. 202-2011, 20.
Zambiazi et al., Fatty Acid Composition of Vegetable Oils and Fats, B. Ceppa, Curitiba, 2007, 111-120, 25(1).
Dunford, Oil and Oilseed Processing II, Division of Agricultural Sciences and Natural Resources, -, www.fapc.biz, FAPC-159.
Hong et al., A Protocol to determine seed storage behaviour, IPGRI Technical Bulletin No. 1, 1996, 1-62, 1.
Justice et al., Principles and Practices of Seed Storage, Agriculture Handbook, 1978.
Kajikawa et al., Production of Arachidonic and Eicosapentaenoic Acids in Plants Usin Bryophyte Fatty Acid Delta6-Desaturase, Delta6-Elongase and Delta5 Desaturase Genes, Bioscience Biochemistry, 2008, 435-444, 72(2).
Khan, Oxidative Stability of Stripped and Nonstripped Borage and Evning Primrose Oils and Their Emulsions in Water, JAOCS, 2000, 963-969, 77(9).
PCT, International Search Report WO2011054801, dated Feb. 21, 2011, 2011.

(Continued)

*Primary Examiner* — Donald R Spamer
*Assistant Examiner* — Assaf Zilbering
(74) *Attorney, Agent, or Firm* — NIXON & VANDERHYE P.C.

(57) ABSTRACT

The present invention describes a vegetable oil comprising a polyunsatured fatty acid having at least 20 carbon atoms (LC-PUFA), which oil has
(a) an anisidine value (AnV) of less than 25;
(b) a peroxide value (POV) of less than 10;
(c) a triglyceride content of greater than 90%; and/or
(d) an Oil Stability Index (OSI) of greater than 5 hours at 80° C.

16 Claims, No Drawings

(56) References Cited

OTHER PUBLICATIONS

Senanayake et al., Oxidative Stability of Structured Lipids Produced From Borage and Evening Primrose Oils with DHA, JAOCS, 2002, 1003-1013, 79(10).

Wu et al., Stepwise Engineering to Produce High Yields of Very Long-Chain Polyunsaturated Fatty Acids in Plants, Nature Biotechnology, 2005, 1013-1017, 23(8).

Dunford, Food Technology Fact Sheet, FAPC-159, "*Oil and oilseed Processing II*", www.fapc.biz.

Zhang Aili, "Improve Ethanol Yield through Minimizing Glycerol Yield in Ethanol Fermentation of *Saccharomyces cerevisiae*", *Chinese Journal of Chemical Engineering*, 16(4), 620-625 (2008).

\* cited by examiner

VEGETABLE OIL COMPRISING A POLYUNSATURATED FATTY ACID HAVING AT LEAST 20 CARBON ATOMS

This application is a divisional of U.S. patent application Ser. No. 14/557,303 filed Dec. 1, 2014, which is a continuation of U.S. patent application Ser. No. 13/504.148 filed Dec. 17, 2012, which is a national phase of International Application No. PCT/EP2010/066599 filed Nov. 2, 2010 which designated the U.S. and claims the benefit of U.S. Provisional Application No. 61/257,772 filed Nov. 3, 2009 and claims priority to International Patent Application No. PCT/EP2009/065593 filed Nov. 22. 2009, the entire contents of which are hereby incorporated by reference in its entirety.

The invention relates to a process for obtaining a polyunsaturated fatty acid having at least 20 carbon atoms (LC-PUFA) or an oil comprising a LC-PUFA from seeds. The invention further relates to a vegetable oil comprising a polyunsaturated fatty acid having at least 20 carbon atoms (LC-PUFA), and uses thereof.

Seeds are known sources of polyunsaturated fatty acids having 18 carbon atoms such as linoleic acid and gamma linolenic acid. It is also known that plants can be genetically modified such that the seeds contain LC-PUFAs. This is for instance disclosed in WO2008009600.

The present inventors realized that recovery of the LC-PUFA or oil containing the LC-PUFA according to WO2008009600 results in oil of insufficient quality.

The inventors realized that the quality of the LC-PUFA and oil comprising the LC-PUFA is of particular concern, since LC-PUFAs are highly sensitive to oxidation. Such sensitivity to oxidation is found to increase further with increasing number of double bonds of the LC-PUFA and/or increasing content of LC-PUFAs.

It is an object of the invention to provide a process for obtaining a polyunsaturated fatty acid having at least 20 carbon atoms (LC-PUFA) or an oil comprising a LC-PUFA from seeds, wherein the LC-PUFA or the oil containing the LC-PUFA has an improved quality.

It is a further object of the invention to provide a vegetable oil comprising a polyunsaturated fatty acid having at least 20 carbon atoms (LC-PUFA), wherein the oil has an improved quality.

According to a first aspect of the invention, there is provided a vegetable oil comprising a polyunsaturated fatty acid having at least 20 carbon atoms (LC-PUFA), which oil has
  (a) an anisidine value (AnV) of less than 25;
  (b) a peroxide value (POV) of less than 10;
  (c) a triglyceride content of greater than 90%;
  (d) an Oil Stability Index (OSI) of greater than 5 hours at 80° C.
  (e) a diglyceride content of less than 8%;
  (f) a free fatty acid content of less than 5%;
  (g) a sterol content of less than 3%; and/or
  (h) a phytosterol content of less than 3%;

In a second aspect, the invention provides a process for obtaining a polyunstaturated fatty acid having at least 20 carbon atoms (LC-PUFA) or an oil comprising a LC-PUFA from seeds, said process comprising
(A)
  (i) providing seeds comprising a LC-PUFA and/or an oil comprising a LC-PUFA; and/or
  (ii) drying the seeds; and/or
  (iii) storing the seeds; and/or
  (iv) grinding and/or flaking the seeds; and/or
  (v) heating the seeds; and/or
  (vi) pressing the seeds such as to expell a fraction of oil
And,
(B) obtaining the LC-PUFA or oil comprising the LC-PUFA from the seeds, optionally by extraction with a solvent.

In a third aspect, the invention provides an oil obtainable by the process according to the second aspect.

(i) Plants and Seeds Comprising a LC-PUFA and/or an Oil Comprising a LC-PUFA

The seeds may be any seeds containing a LC-PUFA and may be the seed of any suitable plant. Preferably, the seeds are the seeds of a transgenic plant. Suitable plants and seeds are for instance described in WO 2005/083093, WO 2008/009600, and WO 2009/130291, the contents of which are hereby incorporated by reference. Other plants and seeds that can be used in the invention are for instance disclosed in WO 2008/100545, WO 2008/124806, WO 2008/124048, WO 2008/128240, WO 2004/071467, WO 2005/059130, the contents of which are hereby incorporated by reference. The seeds may be (transgene) soybeans or (transgene) canola seeds. The plant may be a (transgene) soybean plant or a (transgene) canola plant.

In a preferred embodiment, the seeds are of a (transgenic) plant of the family Brassicaceae, for instance the genera *Brassica, Camelina, Melanosinapis, Sinapis, Arabidopsis*, for example the genera and species *Brassica* alba, *Brassica carinata, Brassica hirta, Brassica napus, Brassicaa rapa* ssp., *Sinapis arvensis, Brassica juncea, Brassica juncea* var. *juncea, Brassica juncea* var. *crispifolla, Brassica juncea* var. *foliose, Brassica nigra, Brassica sinapioides, Camelina sativa, Melanosinapis communis, Brassica oleracea* or *Arabidopsis thaliana*.

It is found that a keeping the keeping the percentage of damaged seeds low, improves the quality of the LC-PUFA or oil containing the LC-PUFA. The (isolated) oil may have a lower AnV, POV, a higher OSI and/or a higher triglyceride content.

Preferably, less than 12% of the seeds are total damaged seeds, preferably less than 8%, preferably less than 5%, preferably less than 3% of the seeds are total damaged seeds.

Preferably, less than 6% of the seeds are distinctly green seeds, preferably less than 4%, preferably less than 2%, preferably less than 1% of the seeds are distinctly green seeds.

Preferably, less than 0.5% of the seeds are heated seeds, preferably less than 0.3%, preferably less than 0.1%, preferably less than 0.05% of the seeds are heated seeds.

In a preferred embodiment, less than 8% of the seeds are total damaged seeds, less than 4% of the seeds are distinctly green seeds, and less than 0.3% of the seeds are heated seeds. In another preferred embodiment, less than 5% of the seeds are total damaged seeds, less than 2% of the seeds are distinctly green seeds, and less than 0.1% of the seeds are heated seeds. In another preferred embodiment, less than 3% of the seeds are total damaged seeds, less than 1% of the seeds are distinctly green seeds, and less than 0.05% the seeds are heated seeds.

As used herein the percentages of total damaged seeds, distinctly green seeds and heated seeds are determined in accordance with the Official Grain Grading Guide. 2001 of the Canadian Grain Commission (for Canola and Rapeseed)

Seeds having the preferred percentages of total damaged seeds, distinctly green seeds and/or heated seeds can be obtained by appropriate selection of the seeds after harvest.

In a further aspect of the invention there, the invention provides seeds comprising an LC-PUFA, and which have percentages of total damaged seeds, distinctly green seeds and/or heated seeds as disclosed hereinabove.

Preferably, the seeds comprise at least 5 wt. %, preferably at least 10 wt. %, preferably at least 15 wt. %, preferably at least 20 wt. % of an LC-PUFA (for instance an LC-PUFA as described hereinbelow, with respect to the total fatty acids in the seeds.

Preferably, the seeds comprise at least 5 wt. %, preferably at least 10 wt. %, preferably at least 15 wt. %, preferably at least 20 wt. % of an 0-6 LC-PUFA, with respect to the total fatty acids in the seeds.

Preferably, the seeds comprise at least 5 wt. %, preferably at least 10 wt. %, preferably at least 15 wt. %, preferably at least 20 wt. % of ARA, with respect to the total fatty acids in the seeds.

Preferably, the seeds comprise at least 5 wt. %, preferably at least 10 wt. %, preferably at least 15 wt. %, preferably at least 20 wt. % of an 0-3 LC-PUFA, with respect to the total fatty acids in the seeds.

Preferably, the seeds comprise at least 5 wt. %, preferably at least 10 wt. %, preferably at least 15 wt. %, preferably at least 20 wt. % of DHA, with respect to the total fatty acids in the seeds.

Preferably, the seeds comprise less than 2 wt. % of erucic acid, preferably less than 1 wt. %, preferably less than 0.5 wt. % based on the total fatty acids in the seeds.

(ii) Drying the Seeds

In an embodiment of the invention, the process comprises drying the seeds. It is found that decreasing the drying temperature improves the quality of the LC-PUFA or oil containing the LC-PUFA. For instance, the (isolated) oil may have a lower AnV, POV, a higher OSI and/or a higher triglyceride content.

In a preferred embodiment, the process according to the invention comprises drying the seeds at a temperature of below 40° C., preferably below 35° C., more preferably below 30° C., more preferably below 25° C. As used herein, the drying temperatures refer to the temperature of the product in the dryer. For instance, if the drier is a fluid bed drier, the drying temperature refers to the temperature of the bed. if It is found that decreasing the temperatures to below the preferred upper limits improves the quality of the oil and/or the LC-PUFA.

The drying may be by any suitable method. The drying may be by natural air drying. Preferably a dryer is used which prevents or minimizes the formation of hot spots. In a preferred embodiment drying is effected using a fluid bed dryer. In a preferred embodiment, conditioned air is used, preferably having a dew point of <15° C., preferably <10° C., preferably <5° C. This further improves the quality of the oil.

Prior to drying the seeds may have a moisture content of for instance 10 to 25 wt. %, such as 15 to 25 wt. %.

The process according to the invention may comprise drying the seeds, resulting a moisture content of less than 15 wt. %, for instance less than 12 wt. %, for instance less than 10 wt. %, for instance less 9.5 wt. %, for instance above 6 wt. %, for instance above 7 wt. %, for instance above 8 wt. %. The moisture content may for instance be between 6 and 15 wt. %, for instance between 7 and 12 wt. %, for instance between 8 and 10 wt. %. Obtaining seeds having a moisture content between the abovementioned ranges improves the quality of the oil and/or LC-PUFA. As used herein, the moisture content is calculated on a wet weight basis, i.e. on the basis of the total weight of the seeds, (including dry matter, lipids, and moisture). It and can be determined by the skilled person.

In a further aspect, the invention provides seeds comprising a LC-PUFA, which have a moisture content of less than 15 wt. %, for instance less than 12 wt. %, for instance less than 10 wt. %, for instance less 9.5 wt. %, for instance above 6 wt. %, for instance above 7 wt. %, for instance above 8 wt. %. The moisture content may for instance be between 6 and 15 wt. %, for instance between 7 and 12 wt. %, for instance between 8 and 10 wt. %. Preferably, the seeds have a percentage of total damaged seeds, distinctly green seeds and/or heated seeds as disclosed hereinabove. In a preferred embodiment, the seeds are obtainable by the drying process as disclosed hereinabove.

In a preferred embodiment, the process comprises drying seeds having the preferred values for the total damaged seeds, distinctly green seeds as mentioned hereinabove.

(iii) Storing the Seeds

In various stages the seeds may be stored. It is found that a decrease of the storage temperature improves the quality of the LC-PUFA and/or oil containing the LC-PUFA. For instance, the (isolated) oil may have a lower AnV, POV, a higher OSI and/or a higher triglyceride content.

Preferably, the process comprising storing the seeds at a temperature of below 10° C., preferably below 5° C., preferably below 0° C., preferably below minus 5° C., preferably below minus 10° C. There is no specific lower limit for the storage temperature. The process may comprise storing the seeds at a temperature of above minus 30° C.

Preferably, seeds are stored having a moisture content of less than 15 wt. %, for instance less than 12 wt. %, for instance less than 10 wt. %, for instance less 9.5 wt. %, for instance above 6 wt. %, for instance above 7 wt. %, for instance above 8 wt. %. The moisture content may for instance be between 6 and 15 wt. %, for instance between 7 and 12 wt. %, for instance between 8 and 10 wt. %. Obtaining seeds having a moisture content between the abovementioned ranges improves the quality of the oil and/or LC-PUFA. As used herein, the moisture content is calculated on a wet weight basis, i.e. on the basis of the total weight of the seeds (including dry matter, lipids, and moisture). It and can be determined by the skilled person.

The preferred moisture contents can be obtained by drying the seeds as described hereinabove.

In a further aspect, the invention provides a process for storing seeds comprising a LC-PUFA, which process comprises storing the storing the seeds at a temperature of below 10° C., preferably below 5° C., preferably below 0° C., preferably below minus 5° C., preferably below minus 10° C. There is no specific lower limit for the storage temperature. The process may comprise storing the seeds at a temperature above minus 30° C.

Preferably, the process comprises storing seeds have a moisture content as disclosed hereinabove.

Preferably, the process comprises storing seeds having a percentage of total damaged seeds, distinctly green seeds and/or heated seeds as disclosed hereinabove.

Preferably, the process comprises storing seeds obtainable by the drying process as disclosed hereinabove.

The seeds may be stored for any suitable period. The seeds may for instance be stored for at least 1 day, for instance at least 1 week, for instance at least 2 weeks, for instance at least 1 months, for instance at least 3 months. There is no specific upper limit for the storage period. The seeds, may for instance be stored for less than 12 months, for instance less than 6 months.

(iv) Crushing and/or Flaking of the Seeds

The process may comprising crushing or flaking, of the seeds, This may facilitate recovery of the LC-PUFA or oil containing the LC-PUFA.

(v) Heating the Seeds

In a preferred embodiment of the invention the process comprises heating the seeds, for instance at a temperature above 60° C.

The process according to the invention may comprise heating the seeds at a relatively low temperature. The process may for instance comprise heating the seeds at a temperature between 50 and 90° C., for instance between 60 and 80° C., preferably for a period of between 2 to 60 minutes, preferably between 5 to 30 minutes. If an increased temperature is selected, the duration of the heating is preferably decreased.

It is found that heating the seeds according to preferred protocols disclosed herein improves the quality of the LC-PUFA and/or oil containing the LC-PUFA. For instance, the (isolated) oil may have a lower AnV, POV, a higher OSI and/or a higher triglyceride content.

In a preferred embodiment, the process according to the invention may comprise heating the seeds at a high rate. The process may for instance comprise heating the seeds, whereby the temperature passes from 40 to 70° C. in less than 1 minute, preferably less than 30 seconds, preferably less than 20 seconds. The process may for instance comprise heating the seeds, whereby the temperature passes from 40 to 100° C. in less than 1 minute, preferably less than 30 seconds, preferably less than 20 seconds.

The process according to the invention may comprises heating the seeds using superheated steam. The process according to the invention may for instance comprise contacting the seeds with superheated steam.

Preferably, the process according to the invention comprises heating the seeds at a relatively high temperature, e.g. between 120 and 160° C. for a relatively short period. The process may for instance comprise maintaining the seeds at a temperature above 120° C., for instance below 160° C., for a period of less than 8 minutes, for instance less than 5 minutes, for instance less than 3 minutes, for instance less than 2 minutes. Maintaining the seeds at a temperature between 120, for instance below and 160° C. may be for a period of at least 5 seconds, preferably at least 10 seconds.

Preferably, the seeds are cooled at a relatively high rate. Preferably, the temperature of the seeds is decreased from the maximum temperature to a temperature of 40° C. in less than 60 minutes, preferably less than 30 minutes, preferably less than 15 minutes.

According to the invention the protocols may be used separately or in combination. For instance, the heating at a high rate may be combined with maintaining the seeds at a preferred temperature for a relatively short period and/or with a rapid cooling rate.

The heating is not limited to a specific stage of the process. The heating may be effected prior to or after any comminuting (e.g. crushing or flaking) of the seeds. In a further aspect, the invention provides a process for heating seeds comprising a LC-PUFA, whereby the seeds are heated as disclosed hereinabove.

(vi) Pressing the Seeds Such as to Expell a Fraction of Oil

Pressing the seeds such as to expell a fraction of oil may be performed using methods known in the art. A screw press may be used. In a preferred embodiment, the invention comprises pressing the seeds to expell oil using a press, for instance a screw press, which is cooled.

(vii) Extracting Oil from the Seeds with a Solvent.

The process according to the invention may comprise extracting oil from the seeds with a solvent. Any suitable solvent may be used, for instance a $C_{1-10}$ alkyl ester (e.g. ethyl or butyl acetate), toluene, a $C_{1-3}$ alcohol (e.g. methanol, propanol), a $C_{3-6}$ alkanes (e.g. hexane) or a supercritical fluid (e.g. liquid $CO_2$ or supercritical propane). Preferably, the solvent is a non-polar solvent, for instance a $C_3$-$C_8$ alkane (preferably hexane) or a supercritical fluid (preferably supercritical $CO_2$ or supercritical propane). Extracting the oil with a non-polar solvent has the advantage that an oil with an increased triglyceride content is obtained.

In a preferred embodiment of the invention, the weight ratio solvent:seeds is at least 3:1, preferably at least 5:1. This enables a more complete extraction of the oil, thereby contributing to the safety of the spent cake resulting after extraction of the oil from the seeds.

In a preferred embodiment, the process according to the invention comprises pressing the seeds to expel the oil, resulting in pressed oil and a press cake, and obtaining oil from the press cake by solvent extraction.

Purifying the Oil

Purifying of the oil may comprise degumming, refining, bleaching and/or deodorizing. These are known steps, and can be carried out by the skilled person.

In a preferred embodiment, deodorizing is effected at a temperature below 200° C., preferably below 190° C., preferably below 185° C. Decreasing the deodorization temperature to below the preferred values improves the quality of the oil.

In another aspect, the invention provides a process for purifying a vegetable oil comprising an LC-PUFA, said process comprising deodorizing the oil at a temperature of below 200° C., preferably below 190° C., preferably below 185° C.

In another aspect of the invention the oil according to the invention is a crude oil, and the invention provides a process for obtaining a purified vegetable oil comprising an LC-PUFA, said process comprising purifying the crude oil.

PUFAs and Oils

As used herein, the following abbreviations are used throughout the entire application:

PUFA refers to a polyunsaturated fatty acid

LC-PUFA (long chain polyunsaturated fatty acid) refers to a PUFA having at least 20 carbon atoms HUFA (highly unsaturated fatty acid) refers to a PUFA having at least three double bonds LC-HUFA (long chain highly unsaturated fatty acid) refers to a polyunsaturated fatty acid having at least 20 carbon atoms and at least three double bonds.

The invention is not limited to a specific LC-PUFA. In an embodiment of the invention, the LC-PUFA has at least three double bonds. In a further embodiment of the invention, the LC-PUFA has at least four double bonds. The benefits are even more pronounced for LC-PUFAs having an increasing number of double bonds, as the sensitivity to oxidation increases with increasing number of double bonds.

The LC-PUFA may be an ω-3 LC-PUFA or an ω-6 LC-PUFA

LC-PUFAs include for instance:

dihomo-γ-linolenic acid (DGLA, 20:3 ω-6)

arachidonic acid (ARA, 20:4 ω-6)

eicosapentaenoic acid (EPA, 20:5 ω-3)

docosapentaenoic acid (DPA, 22:5 ω-3, or DPA 22:5, ω-6), docosahexaenoic acid (DHA: 22:6 ω-3)

Preferred LC-PUFAs include arachidonic acid (ARA) and docosahexaenoic acid (DHA). In particular ARA is preferred.

The vegetable oil may be any vegetable oil containing a LC-PUFA. The vegetable oil may be obtained from a plant, for instance a transgenic plant, or seeds of a (transgenic) plant. Examples of plants are disclosed hereinabove.

The invention provides a vegetable oil comprising a polyunsatured fatty acid having at least 20 carbon atoms (LC-PUFA), which oil has at least one of the following characteristics
(a) an anisidine value (AnV) of less than 25;
(b) a peroxide value (POV) of less than 10;
(c) a triglyceride content of greater than 90%;
(d) an Oil Stability Index (OSI) of greater than 5 hours at 80° C.
(e) a diglyceride content of less than 8%;
(f) a free fatty acid content of less than 5%;
(g) a sterol content of less than 3%; and/or
(h) a phytosterol content of less than 3%

In a preferred embodiment, the vegetable oil according to the invention has an anisidine value (AnV) of less than 25. Preferably, the oil according to the invention has an AnV<20, preferably <15, preferably <10, preferably <5, preferably <3, preferably <2. The vegetable oil may for instance have an AnV>0.1, for instance >0.5, for instance >1. The AnV may be measured according to AOCS Cd-18-90.

In a preferred embodiment, the vegetable oil according to the invention has a peroxide value (POV) of less than 10. Preferably, the oil according to the invention has a POV<5, preferably <2, preferably <1.5, preferably <1, preferably <0.5. The vegetable oil may for instance have a POV>0.1, for instance >0.2. The POV may be measured according to AOCS Cd-8-53. The unit (for POV) is usually meq/kg.

In a preferred embodiment, the vegetable oil according to the invention has a triglyceride content of greater than 85%. Preferably, the oil according to the invention has a triglyceride content >90%, for instance >91%, for instance >93%, for instance >95%, for instance >96%, for instance >97%. The oil according to the invention may for instance have a triglyceride content <99%, for instance <98%. The triglyceride content may be measured using NMR.

In a preferred embodiment, the vegetable oil according to the invention has a diglyceride content or less than 8%. Preferably, the oil according to the invention has a diglyceride content <5%, preferably <3%, preferably <2%, preferably <1%. The oil according to the invention may for instance have a diglyceride content >0.1%, for instance >0.2%, for instance >0.5%. The diglyceride content may be determined using NMR.

In a preferred embodiment, the vegetable oil according to the invention has a free fatty acid content of less than 5%. Preferably, the oil according to the invention has a free fatty acid content <3%, preferably <2%, preferably <1%, preferably <0.5%, preferably <0.2%, preferably <0.1%. The oil according to the invention may for instance have a free fatty acid content >0.01%, for instance >0.02%. The free fatty acid content may be determined using AOCS Ca 5a-40.

In a preferred embodiment, the vegetable oil according to the invention has a sterol content of less than 3%. Preferably, the oil according to the invention has a sterol content of preferably <2%, preferably <1.5%, preferably <1%, preferably <0.8%, preferably <0.5%. The oil according to the invention may for instance have a sterol content >0.1%, for instance >0.2%. As used herein the sterol content refers to the total sterol content, including free sterols and sterol esters. The sterol content may be measured using NMR.

In a preferred embodiment, the vegetable oil according to the invention has a phytosterol content of less than 3%. Preferably, the oil according to the invention has a phytosterol content <2%, preferably <1.5%, preferably <1%, preferably <0.8%, preferably <0.6%, preferably <0.5%. The oil according to the invention may for instance comprise phytosterol, and may for instance have a phytosterol content >0.05%, for instance >0.1%, for instance >0.2%. As used herein, the phytosterol content refers to the total phytosterol content, including free phytosterol and phytosterol esters. The phytosterol content may be determined using NMR.

In a preferred embodiment, the vegetable oil according to the invention has an Oil Stability Index (OSI) of greater than 5 hours at 80° C. Preferably, the oil according to the invention has an OSI>8 hours at 80° C., preferably >10 hours at 80° C., preferably >15 hours at 80° C., preferably >20 hours at 80° C., for instance <50 hours at 80° C., for instance <30 hours at 80° C., for instance <25 hours at 80° C. The OSI may be measured according to AOCS Cd 12b-92.

The vegetable oil according to the invention may comprise an LC-PUFA at any concentration. Preferably, the oil comprises a LC-PUFA, for instance an LC-HUFA, at a concentration >5 wt. % with respect to the total fatty acids in the oil, preferably >10 wt. %, preferably >15 wt. %, preferably >18 wt. %, preferably >20 wt. %, preferably >25 wt. %, preferably >30 wt. %. The oil may for instance comprise a LC-PUFA, for instance an LC-HUFA, at a concentration of <50 wt. %, for instance <40 wt. %, for instance <25 wt. %, for instance <22 wt. % with respect to the total fatty acids in the oil.

Preferably, the oil comprises a LC-PUFA selected from the group consisting of dihomo-γ-linolenic acid (DGLA), arachidonic acid (ARA), eicosapentaenoic acid (EPA), docosapentaenoic acid (DPA, 22:5 ω-3, or DPA 22:5, ω-6) and docosahexaenoic acid (DHA) at a concentration >5 wt. % with respect to the total fatty acids in the oil, preferably >10 wt. %, preferably >15 wt. %, preferably >18 wt. %, preferably >20 wt. %, preferably >25 wt. %, preferably >30 wt. %. The oil may for instance comprise a LC-PUFA selected from the group consisting of dihomo-γ-linolenic acid (DGLA), arachidonic acid (ARA), eicosapentaenoic acid (EPA), docosapentaenoic acid (DPA, 22:5 ω-3, or DPA 22:5, ω-6) and docosahexaenoic acid (DHA), at a concentration of <50 wt. %, for instance <40 wt. %, for instance <25 wt. %, for instance <22 wt. % with respect to the total fatty acids in the oil.

Preferably, the oil comprises arachidonic acid (ARA) at a concentration >5 wt. % with respect to the total fatty acids in the oil, preferably >10 wt. %, preferably >15 wt. %, preferably >18 wt. %, preferably >20 wt. %, preferably >25 wt. %, preferably >30 wt. %. The oil may for instance comprise arachidonic acid (ARA) at a concentration of <50 wt. %, for instance <40 wt. %, for instance <25 wt. %, for instance <22 wt. % with respect to the total fatty acids in the oil.

Preferably, the oil comprises docosahexaenoic acid (DHA) at a concentration >5 wt. % with respect to the total fatty acids in the oil, preferably >10 wt. %, preferably >15 wt. %, preferably >18 wt. %, preferably >20 wt. %, preferably >25 wt. %, preferably >30 wt. %. The oil may for instance docosahexaenoic acid (DHA), at a concentration of <50 wt. %, for instance <40 wt. %, for instance <25 wt. %, for instance <22 wt. % with respect to the total fatty acids in the oil.

Preferably, the sum concentration of PUFAs having at least 3 double bonds is at least 20 wt. % with respect to total fatty acids in the oil, for instance at least 30 wt. %, for instance at least 35 wt. %, for instance at least 40 wt. %. The sum concentration of PUFAs having at least 3 double bonds may for instance be less than 90 wt. %, for instance less than 80 wt. %, for instance less than 70 wt. %, for instance less than 60 wt. %.

Further preferred aspects, embodiments and features are disclosed in the claims

Preferred features and characteristics of one embodiment and/or aspect of the invention are applicable to another embodiment mutatis mutandis. As used herein, the preferred features and characteristics of the LC-PUFA apply to the LC-PUFAs in all aspects and embodiments of the invention.

The invention is further disclosed with reference to the following examples without being limited thereto.

EXAMPLES

Seeds containing 19% Arachidonic acid (with respect to total fatty acids) are obtained from transgenic *Brassica* plants that are transformed using the procedures described in WO2008009600.

The seeds have the following specifications (determined in accordance with the Official Grain Grading Guide, 2001 of the Canadian Grain Commission): distinctly green <2%, total damaged <5%.

The seeds, having a moisture content of 17 wt. %, are dried using a fluid bed drier. The bed temperature is 28° C. Conditioned air is used having a dew point of 10° C. The dried seeds have a moisture content of 8.5 wt. %.

Prior to further processing the dried seeds are stored at a temperature of minus 20° C.

After storage (3 months), the seeds are flaked using a conventional flaking process.

The flakes are subsequently heated to reach a temperature of 130° C. in 20 seconds using superheated steam. The flakes are maintained at this temperature for 1 minute, and cooled to 40° C. in 30 minutes.

Following the heat treatment, the flakes are fed to a cooled expeller to obtain a pressed oil. The biomass exiting the expeller is extracted using hexane (ratio hexane:biomass=5:1) in a submerged counter-current extractor at a temperature of 40° C. The hexane is evaporated, yielding a hexane-extracted oil. The pressed oil and hexane-extracted oil are combined resulting in a crude oil.

The crude oil is purified using degumming (acid treatment), alkali purifying (neutralization), and bleaching using standard techniques. After bleaching the oil is steam deodorized under vacuum at a temperature of 180° C.

The characteristics of the crude and refined oil are given in the table below.

|  | EXAMPLE | | REFERENCE EXPERIMENT | |
| --- | --- | --- | --- | --- |
|  | Crude oil | Refined oil | Crude oil | Refined oil |
| Anisidine | 20 | 9 | 55 | 27 |
| POV | 5 | <1 | 11 | <1 |
| Triglyceride content | 95% | 97% | 86% | 88% |
| OSI at 80° C. | >10 hrs | >10 hrs | 2 hrs | 4 hrs |

REFERENCE EXPERIMENT

Seeds as described in example 1 are treated as follows to recover the oil.

The seeds, having a moisture content of 17 wt. % are dried using a vertical open-flame grain dryer at a temperature of 70° C. resulting in a moisture content of 8.5 wt. %. Prior to further processing the dried seeds are stored at ambient temperature.

After storage (3 months), the seeds are flaked using a conventional flaking process.

After flaking the seeds are steamed at a temperature of 100° C. for 30 minutes.

Following the heat treatment, the flakes are fed to an expeller to obtain a pressed oil. The biomass exiting the expeller is extracted using hexane (ratio hexane:biomass=5:1) in a submerged counter-current extractor at a temperature of 40° C. The hexane is evaporated, yielding a hexane-extracted oil. The pressed oil and hexane-extracted oil are combined resulting in a crude oil.

The crude oil is purified using degumming (acid treatment), alkali purifying (neutralization), and bleaching using standard techniques. After bleaching the oil is steam deodorized under vacuum at a temperature of 180° C.

$^1$H-NMR (to Determine Triglyceride Content)

About 12 mg of an oil sample is weighted accurately into a glass vial and about 12 mg p-nitrotoluene is weighted accurately on top. The sample is dissolved in CDCl$_3$ and $^1$H-NMR spectrum were recorded on a Bruker Avance III 600, equipped with a cryoprobe, operating at a proton frequency of 600 MHz and at a probe temperature of 300 K. The spectrum for quantification was recorded with a 60-90° excitation pulse using standard quantitative parameters with a relaxation delay of 30 s.

The invention claimed is:

1. A process for obtaining a polyunsaturated fatty acid having at least 20 carbon atoms (LC-PUFA) or an oil comprising a LC-PUFA from seeds, said process comprising:
    (A)
        (i) obtaining seeds comprising a LC-PUFA and/or an oil comprising a LC-PUFA,
        (ii) drying the seeds at a temperature of below 40° C. to thereby reduce moisture content of the seeds after drying as compared to the moisture content of the seeds prior to drying,
        (v) subjecting the seeds to a heating protocol by sequentially:
            (v1) rapidly heating the seeds such that the temperature passes from 40 to 100° C. in less than one minute,
            (v2) further heating the seeds to a temperature between 120° C. and 160° C.;
            (v3) maintaining the seeds at the temperature between 120° C. and 160° C. for a period of less than 8 minutes, and thereafter
            (v4) rapidly cooling the seeds to a temperature of 40° C. in less than 60 minutes, and
        one or more of (iii), (iv) or (vi)
        (iii) storing the seeds,
        (iv) grinding and/or flaking the seeds, or
        (vi) pressing the seeds such as to expel a fraction of oil; and
    (B) obtaining the LC-PUFA or oil comprising the LC-PUFA from the seeds, optionally by extraction with a solvent.

2. The process according to claim 1,
    wherein in one or more of (i) to (vi):
    less than 5% of the seeds are total damaged seeds;
    less than 2% of the seeds are distinctly green seeds; and/or
    less than 0.1% of the seeds are heated seeds, as determined in accordance with the Official Grain Grading Guide. 2001 of the Canadian Grain Commission.

3. The process according to claim 1, wherein (ii) comprises drying the seeds at a temperature of below 30° C.

4. The process according to claim 1, wherein (ii) comprises drying the seeds using a fluid bed dryer.

5. The process according to claim 1, wherein (ii) comprises drying the seeds using conditioned air having a dew point of <15° C.

6. The process according to claim 1, wherein (ii) comprises drying the seeds, resulting in a moisture content between 6 and 12 wt. %.

7. The process according to claim 1, wherein (iii) comprises storing the seeds at a temperature of below 10° C.

8. The process according to claim 1, wherein in (v1) the temperature passes from 40 to 70° C. in less than 1 minute.

9. The process according to claim 1, wherein in (v3) the temperature is maintained between 120-160° C. for less than 5 minutes.

10. The process according to claim 1, wherein (vi) comprises pressing the seeds to expel oil using a screw press which is cooled.

11. The process according to claim 1, wherein (vi) comprises pressing the seeds to expel the oil, resulting in a pressed oil and a press cake, and wherein step (B) comprises obtaining oil from the press cake by solvent extraction.

12. The process according to claim 1, wherein the seeds are obtained from a transgenic plant.

13. The process according to claim 1, wherein the process further comprises purifying the oil.

14. The process according to claim 13, wherein said purifying comprises deodorizing the oil at a temperature of below 200° C.

15. The process according to claim 1, wherein the LC-PUFA is defined as in any one of claims 6 to 8 is an ω-3 or ω-6 PUFA.

16. The process according to claim 1, further comprising:
(C) purifying the oil comprising the LC-PUFA to obtain a purified vegetable oil comprising LC-PUFA which has:
  (a) an anisidine value (AnV) of less than 25,
  (b) a peroxide value (POV) of less than 10,
  (c) a triglyceride content of greater than 90%, and/or
  (d) an Oil Stability Index (OSI) of greater than 5 hours at 80° C.

\* \* \* \* \*